Dec. 14, 1926.
C. L. SMITH
1,610,333
NONSKID CHAIN
Filed March 23, 1926
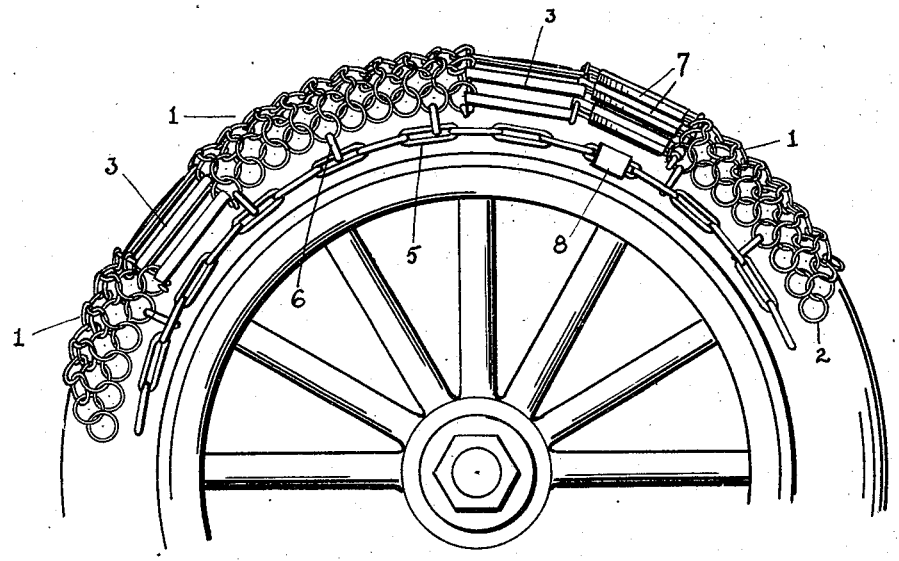
Fig-1
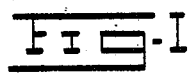
Fig-2
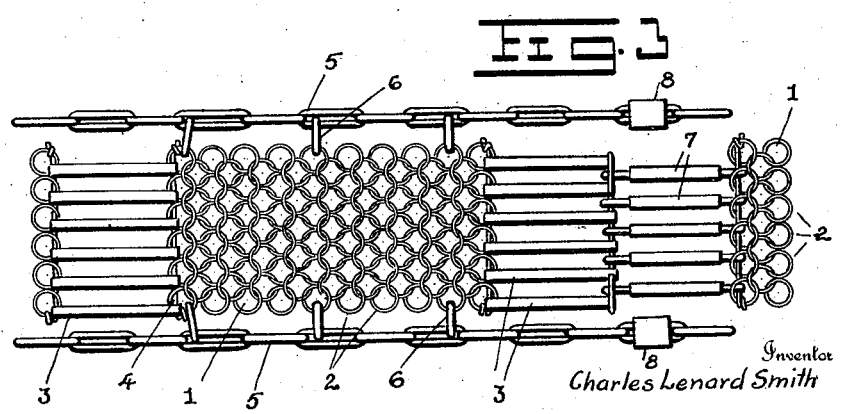
Inventor
Charles Lenard Smith
By Frank Keipes
Attorney Patented Dec. 14, 1926.

1,610,333

UNITED STATES PATENT OFFICE.

CHARLES LEONARD SMITH, OF ROCHESTER, NEW YORK, ASSIGNOR OF FORTY-NINE ONE-HUNDREDTHS TO GEORGE SMITH, OF ROCHESTER, NEW YORK.

NONSKID CHAIN.

Application filed March 23, 1926. Serial No. 96,845.

The object of this invention is to provide a new and improved type of non-skid chain for automobile tires.

This and other objects of this invention will be fully illustrated in the drawing, described in the specification and pointed out in the claims at the end thereof.

In the accompanying drawing:

Figure 1 is a side elevation of a portion of a wheel and tire with the non-skid chain attached thereto.

Figure 2 is a detail perspective view of one of the links of the non-skid chain.

Figure 3 is a top plan view of a portion of the chain as it appears when laid out flat.

In the several figures of the drawing like reference numerals indicate like parts.

The nonskid chain for automobile tires forming the subject matter of this invention comprises a series of wire pads 1, 1, each made up of a series of interlocking circular links 2, 2. Each of these links comprises a coil of wire having about two turns in each coil. The links are interwoven or interlocked with one another as illustrated in the figures and form a very pliable pad that will readily conform to the curvature and outline of the tire when held in place thereon. In interlocking with each other the links assume a slightly angular position so that they project from the tread of the tire and thus take a firm grip on the road when making contact with it.

The pads are fastened together by means of rubber bands 3, 3. For this reason the end of each pad is provided with a cross bar 4 and the rubber bands pass around these cross bars between the circular links 2, 2 thus yieldingly connecting the pads 1, 1 with one another. The rubber bands are supplemented by a pair of chains 5, 5 in holding the pads together. These chains are attached with links 6, 6 to the pads 1 at each side thereof.

For the purpose of applying and disconnecting the anti-skid chain from the tire, suitable detachable links 7, 7 are placed between one of the pads 1, and the rubber bands 3. In addition to the detachable links between the pads 1 the chains 5, 5 are provided with the detachable links 8, 8.

The rubber bands that connect the pads 1 with each other allow the links of each pad to shift should pressure be applied to them. Thus when the wheel or tire provided with one of the nonskid chains is retarded the links of the pad making contact with the road at that moment will be shifted and will cause the links 2, 2 to bunch and form a bulge on the pad that will increase the friction between the pad and the road.

The same is true when the tire rolls around a corner. In this case the links on the side of the tire will be pushed slightly toward the center of the tire and as the result of this will bunch up against the remainder of the links forming a bulge on the side of the tire that will increase the friction between the chain and the road and prevent skidding when turning a corner.

From the foregoing it will be seen that the non-skid chain is held snugly around the tire but the connecting rubber bands between the friction or nonskid pads allow the links thereof to shift and to bunch when retarded and thus increase the friction between the road and the tire whenever it is needed the most.

I claim:

1. A non-skid tire chain comprising a series of friction pads, each of said pads comprising a series of links interlocked with one another, and yielding means connecting said pads.

2. A non-skid tire chain comprising a series of friction pads, each of said pads comprising a series of circular wire coils interlocked with one another and held angular to one another, yielding means connecting said pads to allow the links of said pads to shift and bunch up when the links are retarded or pressure is applied against them.

In testimony whereof I affix my signature.

CHAS. LEONARD SMITH.